(12) United States Patent
Hwang et al.

(10) Patent No.: US 7,764,579 B2
(45) Date of Patent: Jul. 27, 2010

(54) METHOD AND APPARATUS FOR RECORDING DATA ON DISK

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1604 days.

(21) Appl. No.: 11/029,426

(22) Filed: Jan. 6, 2005

(65) Prior Publication Data

US 2005/0185551 A1  Aug. 25, 2005

(30) Foreign Application Priority Data

Feb. 24, 2004  (KR) ............... 10-2004-0012291

(51) Int. Cl.
  *G11B 27/36*  (2006.01)
(52) U.S. Cl. ............... 369/47.14; 369/53.16; 369/53.17
(58) Field of Classification Search ............. 369/53.15, 369/53.17, 30.07, 47.14, 275.3
See application file for complete search history.

(56) References Cited

U.S. PATENT DOCUMENTS

| | | | | |
|---|---|---|---|---|
| 5,237,553 | A * | 8/1993 | Fukushima et al. | 369/53.17 |
| 6,160,778 | A * | 12/2000 | Ito et al. | 369/53.15 |
| 6,625,094 | B1 | 9/2003 | Park et al. | |
| 6,915,374 | B2 * | 7/2005 | Pereira | 711/5 |
| 7,545,710 | B2 * | 6/2009 | Hwang et al. | 369/47.14 |
| 2004/0120233 | A1 * | 6/2004 | Park et al. | 369/47.13 |
| 2005/0083812 | A1 * | 4/2005 | Miyamoto et al. | 369/53.2 |
| 2005/0188152 | A1 * | 8/2005 | Park | 711/112 |

FOREIGN PATENT DOCUMENTS

| | | |
|---|---|---|
| EP | 0 325 823 | 8/1989 |
| EP | 1347452 A2 * | 9/2003 |
| WO | 2004/086379 A1 | 10/2004 |

OTHER PUBLICATIONS

Yokozeki, T. et al., "A Virtual Optical Disk Method to Realize Rewritability and Revision Control on a Write-Once Optical Disk" Systems and Computers in Japan, Scripta Technical Jourals, Jan. 1990, Vol. 21, No. 8, pp. 34-43.

* cited by examiner

*Primary Examiner*—Thang V Tran
*Assistant Examiner*—Dionne H Pendleton
(74) *Attorney, Agent, or Firm*—NSIP Law

(57) ABSTRACT

A recording method, a host apparatus, a recording and/or reproducing apparatus, an optical recording information storage medium, and a computer readable recording medium storing a program for performing the method of recording. The method of recording data on a disk includes: when new data is desired to be recorded on the disk, at an address at which data is already recorded, updating a defect list by writing in the defect list defect information of the address at which the data is already recorded; and transmitting to a recording and/or reproducing apparatus the updated defect list and a command to record the new data at the address at which the data is already recorded. According to the method, overwriting is implemented on a write-once medium and furthermore, when this overwrite is implemented, the load on the drive system is reduced.

26 Claims, 12 Drawing Sheets

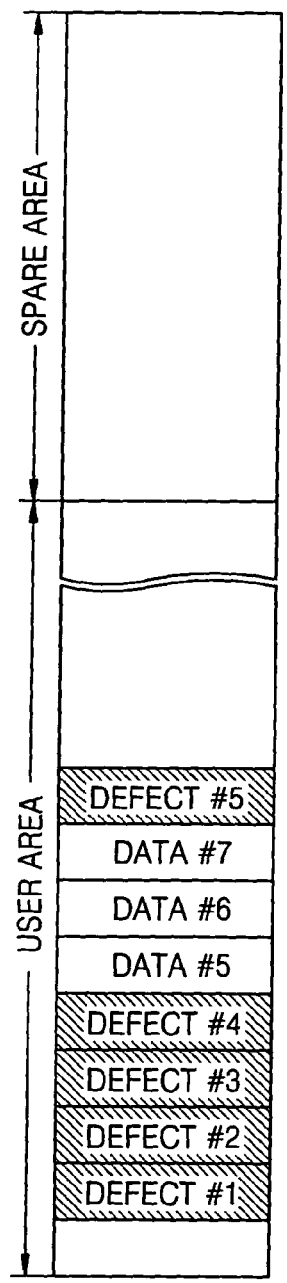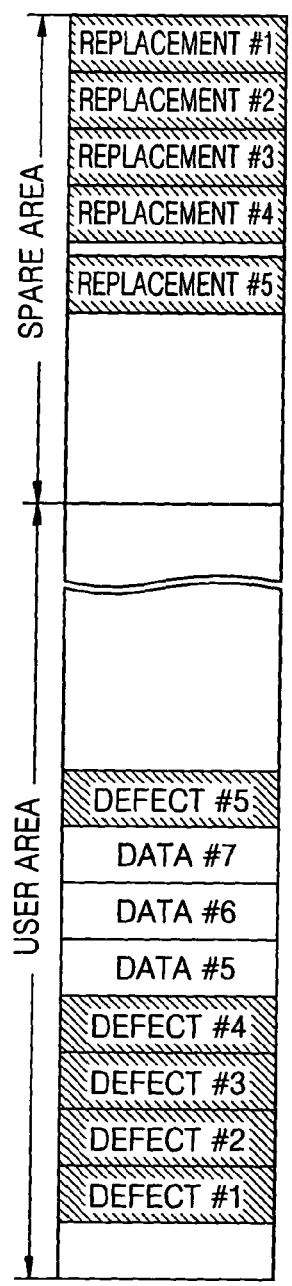

FIG. 10A

| STATE INFORMATION | | DEFECT BLOCK ADDRESS | REPLACEMENT BLOCK ADDRESS |
|---|---|---|---|
| REPLACEMENT INFORMATION | CONTINUOUS DEFECT INFORMATION | | |
| 2 | 0 | 100000h | - |
| 2 | 0 | 100001h | - |
| ... | ... | ... | ... |
| 2 | 0 | 1000FFh | - |
| 2 | 0 | 100100h | - |

FIG. 10B

| STATE INFORMATION | | DEFECT BLOCK ADDRESS | REPLACEMENT BLOCK ADDRESS |
|---|---|---|---|
| REPLACEMENT INFORMATION | CONTINUOUS DEFECT INFORMATION | | |
| 0 | 0 | 100000h | 110000h |
| 0 | 0 | 100001h | 110001h |
| ... | ... | ... | ... |
| 0 | 0 | 1000FFh | 1100FFh |
| 0 | 0 | 100100h | 110100h |

FIG.11A

| STATE INFORMATION | | DEFECT BLOCK ADDRESS | REPLACEMENT BLOCK ADDRESS |
|---|---|---|---|
| REPLACEMENT INFORMATION | CONTINUOUS DEFECT INFORMATION | | |
| 2 | 1 | 100000h | – |
| 2 | 2 | 100100h | – |

FIG.11B

| STATE INFORMATION | | DEFECT BLOCK ADDRESS | REPLACEMENT BLOCK ADDRESS |
|---|---|---|---|
| REPLACEMENT INFORMATION | CONTINUOUS DEFECT INFORMATION | | |
| 0 | 1 | 100000h | 110000h |
| 0 | 2 | 100100h | 110100h |

FIG. 13A

| STATE INFORMATION ||  DEFECT BLOCK ADDRESS | REPLACEMENT BLOCK ADDRESS |
|---|---|---|---|
| REPLACEMENT INFORMATION | CONTINUOUS DEFECT INFORMATION | | |
| 1 | 0 | 100000h | 110000h |
| 1 | 0 | 100001h | 110001h |
| ... | ... | ... | ... |
| 1 | 0 | 1000FFh | 1100FFh |
| 1 | 0 | 100100h | 110100h |

FIG. 13B

| STATE INFORMATION || DEFECT BLOCK ADDRESS | REPLACEMENT BLOCK ADDRESS |
|---|---|---|---|
| REPLACEMENT INFORMATION | CONTINUOUS DEFECT INFORMATION | | |
| 0 | 0 | 100000h | 110000h |
| 0 | 0 | 100001h | 110001h |
| ... | ... | ... | ... |
| 0 | 0 | 1000FFh | 1100FFh |
| 0 | 0 | 100100h | 110100h |

FIG. 14A

| STATE INFORMATION ||  DEFECT BLOCK ADDRESS | REPLACEMENT BLOCK ADDRESS |
|---|---|---|---|
| REPLACEMENT INFORMATION | CONTINUOUS DEFECT INFORMATION | | |
| 1 | 1 | 100000h | – |
| 1 | 2 | 100100h | – |

FIG. 14B

| STATE INFORMATION || DEFECT BLOCK ADDRESS | REPLACEMENT BLOCK ADDRESS |
|---|---|---|---|
| REPLACEMENT INFORMATION | CONTINUOUS DEFECT INFORMATION | | |
| 0 | 1 | 100000h | 110000h |
| 0 | 2 | 100100h | 110100h |

METHOD AND APPARATUS FOR RECORDING DATA ON DISK

CROSS-REFERENCE TO RELATED APPLICATION

This application claims the priority of Korean Patent Application No. 2004-12291, filed on Feb. 24, 2004 in the Korean Intellectual Property Office, the disclosure of which is incorporated herein by reference.

BACKGROUND OF THE INVENTION

1. Field of the Invention

The present invention relates to a disk, and more particularly, to a method of recording data on the disk, and a host apparatus, a recording and/or reproducing apparatus, an optical recording information storage medium, and a computer readable recording medium storing a program, each of which perform the method of recording the data on the disk.

2. Description of the Related Art

Due to its characteristic that data is recorded only once, it is impossible to overwrite recorded data in a write-once medium. Accordingly, only special recording methods, such as disk at once or sequential recording in units of tracks, have been used.

Commands to record data on an information storage medium can be roughly broken down into two types. One is a simple data write command, and the other is a verify-after-write command used to request verification of the reliability of data after the data has recorded. The latter is performed for data requiring a high level of reliability, such as file system data. This is because when a defect occurs in ordinary data, the damage is limited to a file unit, but in the case of a file system data, if the file system data cannot be recovered, the entire medium cannot be recovered. Accordingly, if through verification it is determined that the reliability of data is degraded, a defect management method is performed such that the reliability of data can be guaranteed.

However, when a host is asked to overwrite data in an area where data is already recorded on a write-once medium, it is difficult to achieve the purpose of the host with only the above two commands. Accordingly, a method capable of performing overwriting data on a write-once medium as if on a rewritable information storage medium is necessary.

SUMMARY OF THE INVENTION

According to an aspect of the present invention, there is provided a recording method, and a host apparatus, a recording and/or reproducing apparatus, an optical recording information storage medium, and a computer readable recording medium storing a program for performing the method, by which overwriting can be implemented on a write-once medium and furthermore when this overwrite is implemented, load on a drive system can be reduced.

According to an aspect of the present invention, there is provided a method of recording data on a disk including: when new data is to be recorded on the disk at an address at which data is already recorded, updating a defect list by writing in the defect list defect information regarding the address at which the data is already recorded; and transmitting to a recording and/or reproducing apparatus the updated defect list and a command to record the new data at the address at which the data is already recorded.

According to an aspect of the present invention, the method may further include receiving from the recording and/or reproducing apparatus a defect list including defect information regarding data recorded on the disk.

According to an aspect of the present invention, updating the defect list may include recording in the defect list defect information including replacement information indicating that a defect block corresponding to the address at which the data is already recorded on the disk is a defect which does not have a replacement block to replace the defect block.

According to an aspect of the present invention, updating the defect list may include recording in the defect list defect information including replacement information indicating that a defect block of the address in which the data is already recorded on the disk is a defect which has a replacement block to replace the defect block, and that no data is recorded in the replacement block yet.

According to another aspect of the present invention, there is provided a method of recording data on a disk including transmitting to a host a defect list including information on a defect of data recorded on the disk; receiving an updated defect list from the host and updating a defect list; receiving from the host a command to record new data at an address in which data is already recorded on the disk; and by referring to the updated defect list, recording data on the disk.

According to an aspect of the present invention, the updated defect list may include defect information on the address at which data is already recorded on the disk.

According to an aspect of the present invention, the defect information may include replacement information indicating that a defect block corresponding to the address at which the data is already recorded on the disk is a defect which does not have a replacement block replacing the defect block.

According to an aspect of the present invention, recording data on the disk may include recording a replacement block including the new data, in a spare area of the disk.

According to an aspect of the present invention, the defect information may include replacement information indicating that a defect block corresponding to the address at which the data is already recorded on the disk is a defect which has a replacement block which is to replace the defect block, and that no data is recorded in the replacement block yet. Recording data on the disk may include: recording the new data in a replacement block in the spare area of the disk.

According to still another aspect of the present invention, there is provided a host apparatus controlling data to be recorded on a disk, including a memory unit which stores a defect list which is received from a recording and/or reproducing apparatus and includes defect information regarding data recorded on the disk; a control unit which, when new data is to be recorded at an address in which other data is already recorded on the disk, updates the defect list by recording in the defect list defect information regarding the address in which the other data is already recorded, and transmitting the updated defect list and a write command to record the new data at the address in which the other data is already recorded, to the recording and/or reproducing apparatus.

According to yet still another aspect of the present invention, there is provided a recording and/or reproducing apparatus including a writing and/or reading unit, which records data on or reads data from a disk; and a control unit, which in response to receiving from a host an updated defect list and a write command to record new data at an address in which other data is already recorded, controls the writing and/or reading unit such that data is recorded on the disk by referring to the updated defect list.

According to a further aspect of the present invention, there is provided an optical recording information storage medium including a user area for recording user data; a spare area for recording replacement data to replace the user data in order to update the user data already recorded in the user area; and a disk management area for recording a defect list which includes defect information on the user data and the replacement data and is updated by a host or a drive system.

According to an aspect of the present invention, the defect list may include the physical address of a defect block in relation to the user data already recorded in the user area, the physical address of a replacement block in relation to the replacement data, and state information regarding the defect block.

According to an aspect of the present invention, the state information may include replacement information indicating that the defect block in relation to the user data already recorded in the user area is a defect which does not have a replacement block.

According to an aspect of the present invention, the state information may include replacement information indicating that the defect block in relation to the user data already recorded in the user area is a defect which has a replacement block in which new data is not recorded yet.

According to an aspect of the present invention, the state information may further include continuous defect information indicating the defect block is a continuous defect block occurring in a continuous location on the medium.

According to an additional aspect of the present invention, there is provided a computer readable recording medium having embodied thereon a computer program performing a method of recording data on a disk, wherein the method includes: when new data is desired to be recorded on the disk at an address in which data is already recorded, updating a defect list by writing in the defect list defect information regarding the address at which the data is already recorded; and transmitting to a recording and/or reproducing apparatus the updated defect list and a command to record the new data at the address in which the other data is already recorded.

According to an additional aspect of the present invention, there is provided a computer readable recording medium having embodied thereon a computer program for a method of recording data on a disk, wherein the method includes: transmitting to a host a defect list including information on a defect of data recorded on the disk; receiving an updated defect list from the host and updating a defect list; receiving from the host a command to record new data at an address in which data is already recorded on the disk; by referring to the updated defect list, recording data on the disk.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 7A and 7B are reference diagrams explaining a method used by a host to update a defect list in order to implement logical overwriting according to an embodiment of the present invention;

FIG. 10A is a diagram of an example of a defect list updated by a host in relation to a single defect according to an embodiment of the present invention;

FIG. 10B is a diagram showing a state of the defect list shown in FIG. 10A, the state updated by a drive;

FIG. 11A is a diagram of an example of a defect list updated by a host in relation to continuous defects according to an embodiment of the present invention;

FIG. 11B is a state of the defect list shown in FIG. 11A, the state updated by a drive;

FIG. 13A is a diagram of an example of a defect list updated by a host in relation to a single defect according to another embodiment of the present invention;

FIG. 13B is a state of the defect list shown in FIG. 11A, the state updated by a drive;

FIG. 14A is a diagram of an example of a defect list updated by a host in relation to continuous defects according to another embodiment of the present invention; and FIG. 14B is a state of the defect list shown in FIG. 14A, the state updated by a drive.

DETAILED DESCRIPTION OF THE EMBODIMENTS

Figure 1:
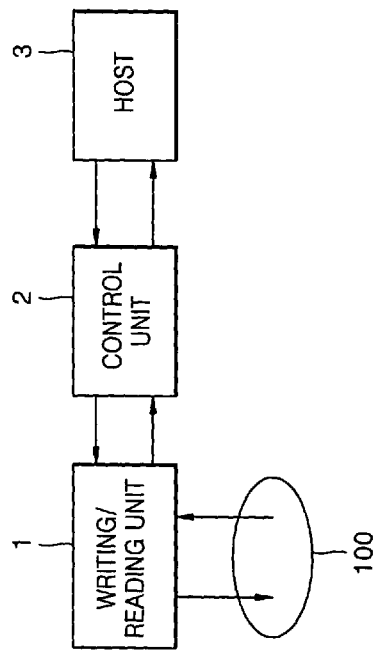
FIG. 1 is a schematic block diagram of an embodiment of a recording and/or reproducing apparatus according to an aspect of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In a write-once medium, overwriting data is impossible due to the characteristic of the medium that data can be recorded only once, and if only data is recorded, writing data over the recorded data or rewriting data after deleting recorded data is impossible. However, by using a predetermined defect management method for managing defects occurring in a disk, data can be overwritten even on a write-once medium. Defect management is a process to compensate for data loss caused by occurrence of a defect in user data recorded in a user data area, by recording user data again in an area where the defect occurs. An example of defect management is linear replacement, by which when a defect occurs in a user data area, the area in which the defect occurs is replaced by an area in a spare area in which no defect occurs.

Though data is not actually overwritten at a physical address where data is already recorded on a write-once medium, the defect management method can be used to make the data look as if it was overwritten from the viewpoint of a host.

This is possible because the host uses a logical address of the disk when searching for a predetermined location of the disk. That is, the host sends a data write or read command to a drive system with a logical address of the data. The drive system receives this write or read command, converts the logical address received from the host into a physical address, and searches for the location of the data recorded on the disk with this converted physical address. Accordingly, if data is overwritten by changing only the physical address of data without changing in the logical address, the host can be made to think that data is overwritten on the disk.

More specifically, for example, if a host commands a drive system to overwrite new data A' at logical address "100" where data A is already recorded, the drive system converts the logical address "100" into a physical address. If the converted physical address is "10000", the drive system learns that data is already recorded at physical address "10000" and by using an example of a disk defect management method, can treat data related to physical address "10000" as a defect block. That is, the data related to this location is treated as a defect, a replacement block to replace this defect block is prepared at physical address "20000" in a spare area, and new data A' is recorded in the replacement block prepared at physical address "20000" of the spare area. Also, regarding this defect block, an entry indicating that the physical address of this defect block is "10000", and the physical address of the replacement block replacing this defect block is "20000", is registered in a defect list.

Then, if after that time the host transmits a command to reproduce data at logical address "100" to the drive system, the drive system first converts the logical address "100" into a physical address "10000". The drive system searches the defect list for the converted physical address "10000", and learns that the physical address "10000" is treated as a defect block and that a replacement block replacing this defect block is at physical address "20000". Accordingly, the drive system can access physical address "20000", read valid data A', and transmit the data to the host.

Since the host sees the disk only with logical addresses though the physical addresses of data A and data A' are actually different, it looks as if data A' is overwritten at the location where data A is recorded.

Hereinafter, an overwrite in a write-once medium by using a predetermined defect management method will be referred to as "logical overwriting".

A logical overwrite can be performed by a command from a host or inside a drive system depending on the implementation.

For example, where the logical overwrite is performed by a command from a host, in order to implement the overwrite, the host transmits a replacement-enforcement-write command for an area where data is already recorded, to the drive system, and the drive system receiving this command records data by replacement according to a predetermined defect management method, and also updates defect information to indicate the replaced result. By doing so, a logical overwrite can be implemented. Since the logical overwrite is briefly described above, a detailed explanation thereof will be omitted.

An aspect of the present invention is to implement a method by which the updating of a defect list which is normally performed by a drive system when a logical overwrite is implemented, is performed by a host.

That is, when a host is desired to perform a logical overwrite on an area where data is already recorded on a disk in which logical overwrite is possible, the host first updates defect information on a physical address area corresponding to the logical address at which logical overwriting is desired to be performed, and sends a write command at this logical address to the drive system. Then, the drive system identifies defect information corresponding to the physical address on the disk according to the logical address, and performs data recording.

The update method performed by a host can be considered in two ways.

In a first embodiment, the host registers in a defect list a physical address corresponding to a logical address at which logical overwriting is to be performed, as defect information having no replacement block, or updates the defect list with the physical address. For this, the drive system should provide a defect list to the host.

In a second embodiment, the host registers in a defect list a physical address corresponding to a logical address at which logical overwrite is to be performed, as defect information having a replacement block in which data is not recorded yet, or updates the defect list with the physical address. For this, the drive system should provide detailed information of a spare area as well as the defect list such that the host can learn. The detailed information of the spare area includes information on the location of the spare area and information on the location of replacement blocks that can replace defect blocks. This is because the host should have information on individual positions in the spare area and information on blocks in respective spare areas that can replace defect blocks in order to register in the defect list the physical address on the disk corresponding to a logical address at which a logical overwrite is to be performed, as defect information, or update the defect list with the physical address.

The implementation of logical overwriting according to an aspect of the present invention will now be explained in more detail.

FIG. 1 is a schematic block diagram of an embodiment of a recording and/or reproducing apparatus according to an aspect of the present invention.

Referring to FIG. 1, the apparatus according to an aspect of the present invention is capable of recording and/or reproducing data, and includes a writing and/or reading unit 1 and a control unit 2. Under the control of the control unit 2 the writing and/or reading unit 1, records data on a disk 100 that is an information storage medium according to the present embodiment, and reads data from the disk 100 in order to reproduce data. In response to a write and/or read command of a host 3 the control unit 2 controls the writing and/or reading unit 1 such that data is recorded in recording unit blocks, or by processing data read by the writing and/or reading unit 1. The control unit 2 obtains valid data by performing error correction for read data, and the reproduction is performed on a predetermined unit-by-unit basis. A unit for performing reproduction is referred to as a reproduction unit block corresponding to recording unit blocks. A reproduction unit block corresponds to at least one recording block.

When data is recorded, in order to perform logical overwrite recording according to an aspect of the present invention, the control unit 2 controls the writing and/or reading unit 1 to read disk management information and a defect list recorded in a predetermined area of the disk 100, and transmits the read information to the host 3. Then, the host 3 registers in the defect list defect information of an address at which logical overwriting is to be performed, or updates the defect list with the defect information, and transmits the updated defect list to the control unit 2. Then, the control unit 2 updates the defect list maintained by the control unit 2, with the defect list transmitted from the host 3. When updating of the defect list of the control unit 2 is finished, the host 3 transmits to the control unit 2 a write command to perform a logical overwrite at a desired address. If this write command is received, the control unit 2 implements logical overwrite by referring to the updated defect list. That is, the control unit 2 controls the writing and/or reading unit 1 such that data content to be written over the block (hereinafter referred to as a 'defect block') of a physical address at which the logical overwrite is to be performed in a user data area of the disk, is recorded in a block (hereinafter referred to as a 'replacement block') at a physical address used as a spare area, and records in the defect list defect information indicating that replacement data is recorded in the replacement block.

When data is reproduced, the writing and/or reading unit 1 reads the defect list and disk management information from the disk 100, and transmits the defect list and disk management information to the control unit 2. The control unit 2 finds in the defect list a physical address corresponding to the logical address received from the host 3, and controls the writing and/or reading unit 1 such that data is read from the physical address of the replacement block corresponding to the defect block, and reproduces the data.

Figure 2:
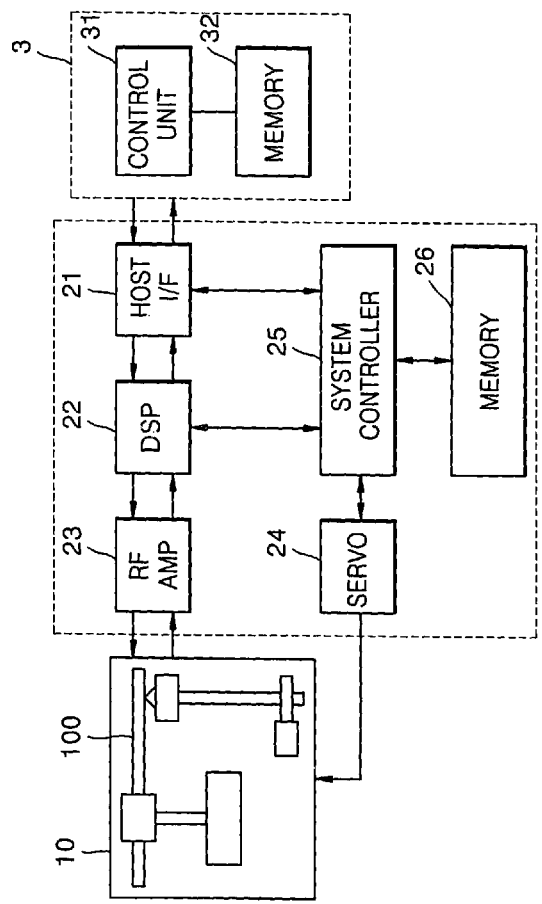
FIG. 2 is a detailed diagram of a drive system, which is an implementation of the recording and/or reproducing apparatus shown in FIG. 2.

FIG. 2 is a detailed diagram of a drive system which is one possible implementation of the recording and/or reproducing apparatus shown in FIG. 1.

Referring to FIG. 2, the disk drive includes a pickup 10, which corresponds to the writing and/or reading unit 1. The disk 100 is placed over the pickup 10. The disk drive also includes a host I/F 21, a DSP 22, an RF AMP 23, a servo 24, a system controller 25, and a memory, which together correspond to the control unit 2.

When logical overwrite recording is performed, first, the system controller 25 reads disk management information, a defect list, and detailed information on a spare area (detailed information on the defect list and the spare area can be included in the disk management information) from the disk 100, stores the information in the memory 26, and also transmits the information to the host 3. The control unit 31 of the host 3 stores the information in the memory 32, and registers in the defect list the defect information on the physical address corresponding to a logical address at which logical overwrite is desired to be performed on the disk 100, or updates the defect list with the defect information. If defect information of the physical address is already in the defect list, update is performed and if the defect information is not in the defect list, new registration is performed. The defect information registered or updated in the defect list can be defect information having no replacement block according to an embodiment of the present invention or can be defect information having a replacement block at which data is not recorded yet.

After thus updating the defect list, the control unit 31 of the host 3 transmits this defect list to the system controller 25 of the drive system. When the defect list is received, the system controller 25 of the drive system updates the defect list stored in the memory 26 with the defect list received from the host.

Then, if the control unit 31 of the host 3 transmits to the drive system a data write command together with a logical address at which logical overwrite is to be performed, the host I/F 21 receives the write command together with data to be recorded, from the host. The system controller 25 performs initialization required for recording. The system controller 25 converts the logical address received from the host I/F 21, into a physical address, and searches the defect list stored in the memory 26 for this address. If the defect information on the physical address found in the defect list indicates a defect block having no replacement block, the system controller 25 selects a replacement block to replace the defect block, from spare area information, and controls the DSP 22 and the servo 24 such that data is recorded in the selected replacement block. If the defect information indicates a defect block having a replacement block in which data is not recorded in the replacement block yet, the replacement block in the spare area is already selected, and therefore, the system controller 25 controls the DSP 22 and the servo 24 such that data is recorded in the replacement block. Then, the system controller 25 updates the defect list stored in the memory 26, with state information indicating the defect block having a replacement block.

The DSP 22 adds additional data such as a parity for error correction, to the data which is received from the host I/F 21 and is to be recorded, performs ECC encoding, generates an ECC block i.e., an error correction block, and then modulates the ECC block according to a predetermined method. The RF AMP 23 converts the data output from the DSP 22 into an RF signal. The pickup 10 records the RF signal output from the RF AMP 23 on the disk 100. The servo 24 receives a command required for servo control from the system controller 25 and servo controls the pickup 10.

When data is reproduced, the host I/F 21 receives a read command from the host 3. The system controller 25 performs initialization required for reproduction. The pickup 10 irradiates a laser beam on the disk 100, and outputs an optical signal obtained by receiving the laser beam reflected from the disk 100. The RF AMP 23 converts the optical signal output from the pickup 10 into an RF signal, and provides modulated data obtained from the RF signal, to the DSP 22, and also provides a servo signal for control obtained from the RF signal, to the servo 24. The DSP 22 demodulates the modulated data and outputs data obtained through ECC error correction.

Meanwhile, the servo 24 receives a servo signal from the RF AMP 23 and a command required for servo control from the system controller 25, and performs servo control. The host I/F 21 transmits data received from the DSP 22 to the host.

Figure 3:
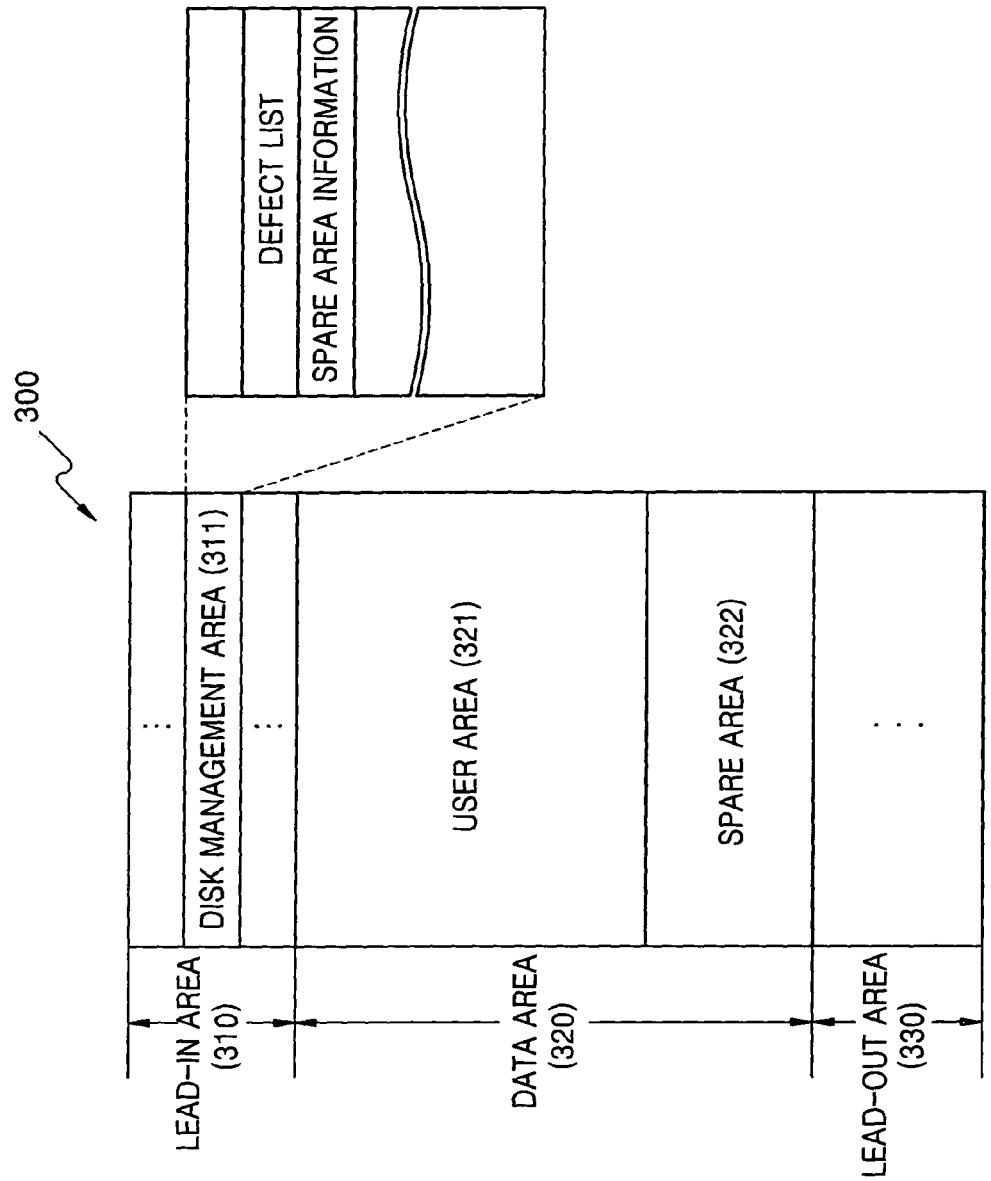
FIG. 3 is a diagram of the structure of a disk used in the present invention.

FIG. 3 is a diagram of the structure of a write-once disk according to an aspect of the present invention.

Referring to FIG. 3, the write-once disk 300 includes a lead-in area 310, a data area 320, and a lead-out area 330.

The lead-in area 310 is disposed on an inner circumference of the disk 300, and includes a disk management area 311. Information for management of the write-once disk 300 is recorded in the disk management area 311. This information for management of the write-once disk 300 includes a defect list and spare area information. The defect list and spare area information are recorded in the disk management area 311 of the lead-in area 310 according to the embodiment shown in FIG. 3, but alternatively, can be recorded in the data area or the lead-out area. The spare area information includes information on the location of the spare area 322 and information on replacement blocks available in the spare area 322. The defect list will be explained later in more detail.

The data area 320 is disposed between the lead-in area 310 and the lead-out area 330, and includes the user area 321 and the spare area 322.

User data is recorded in the user area 321. When new data is to be written over a part of the user area 321 in which user data is already recorded, the new data is recorded in the spare area 322. Hereinafter, when a logical overwrite is to be performed over user data already recorded in the user area, the already recorded user data will be referred to as a "defect block" and the new data which to overwrites the defect block and is recorded in the spare area 322 will be referred to as a "replacement block."

The lead-out area 330 can be used as a disk management area in addition to the disk management area 311. The lead-out area 330 can also be used as an area for recording information related to disk management and recording data.

Figure 4:
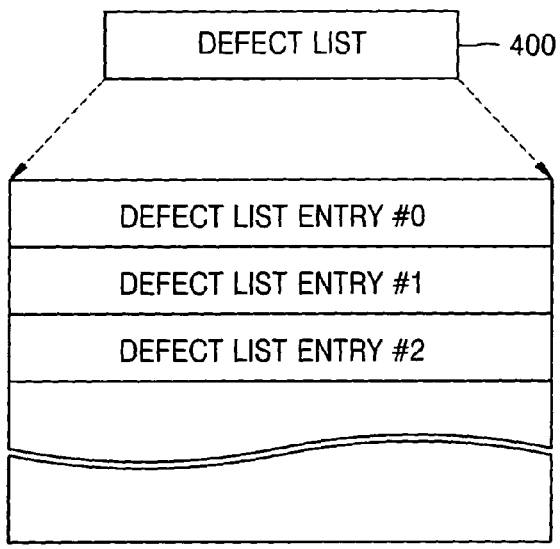
FIG. 4 is a diagram of an example of a defect list according to an aspect of the present invention.

The detailed structure of the defect list recorded in the disk management area 311 is shown in FIG. 4.

FIG. 4 is a diagram of an example of a defect list according to an aspect of the present invention.

Referring to FIG. 4, the defect list 400 includes defect list entries #0, #1, #2, and so on.

These defect list entries correspond to information on respective defects. Defects occurring in one block of the user area are treated as a single defect. Generally, for a single defect, only one defect list entry is generated for the defect block. When defects occurring in the user area are continuous, that is, when defects are continuously ranging over a plurality of blocks, the defects are referred to as continuous defects.

For continuous defects, generating defect list entries for the first defect block and the last defect block among the defective blocks of the continuous defect is more efficient than generating one defect list entry for each defect block. Accordingly, for a continuous defect, two defect list entries are generated: a defect list entry for the first defect block and a defect list entry for the last defect block.

Figure 5:
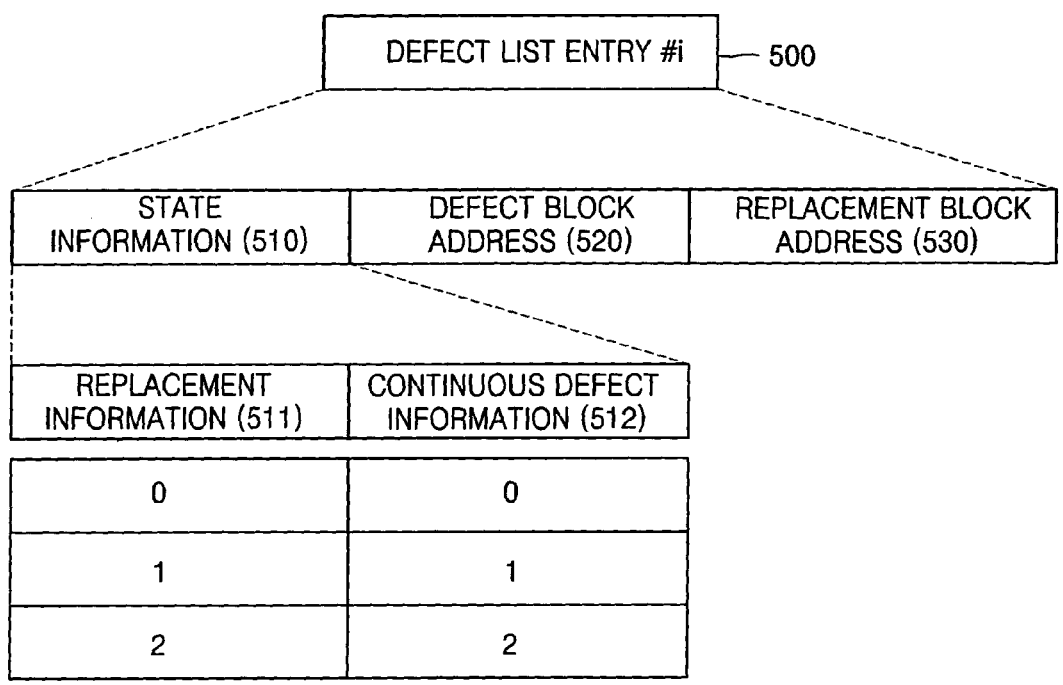
FIG. 5 is a diagram of the data structure of a defect list entry shown in FIG. 4.

FIG. 5 is a diagram of the data structure of a defect list entry shown in FIG. 4.

Referring to FIG. 5, a defect list entry #i 500 includes state information 510, a defect block address 520, and a replacement block address 530.

The state information 510 indicates state information on a defect, and includes replacement information 511 and continuous defect information 512.

The defect block address 520 indicates the address of a defect block in the user area, and shows, for example, the physical sector number of the defect block.

The replacement block address 530 indicates the address of a replacement block in the spare area, and shows, for example, a physical sector address of a replacement block.

The state information 510 will now be explained in more detail.

The replacement information 511 indicates whether or not a defect block corresponding to a defect list entry has a replacement block.

If the replacement information 511 is "0", it indicates that a defect block specified in the defect block address 520 of the defect list entry 500 has a replacement block specified in the replacement block address 530 and data is also recorded in the replacement block.

If the replacement information 511 is "1", it indicates that a defect block specified in the defect block address 520 of the defect list entry 500 has a replacement block specified in the replacement block address 530 but data is not recorded in the replacement block.

If the replacement information 511 is "2", it indicates that a defect block specified in the defect block address 520 of the defect list entry 500 does not have a replacement block.

This replacement information 511 can be updated by the drive system or the host.

The necessity of the defect list entry having replacement information "1" in a write-once medium will now be explained in more detail.

Generally, if a write-once medium having a defect management system is placed in a drive which does not permit logical overwriting, a defect list entry having replacement information of "1" (a defect list entry for a defect block having a replacement block in which data is not recorded in the replacement block yet) is not needed. This is because overwriting data cannot be overwritten due to the write-once medium and if a host does not perform recording by logical overwriting, the host does not make a command to record data at a logical address corresponding to a defect block address of defect information having the replacement information "1". Accordingly, the drive system will never use this defect information. As a result, in a write-once medium having a defect management system by a drive which does not permit logical overwrite, a defect list entry having replacement information "1" is not needed. However, in a write-once medium having a defect management system by a drive permitting logical overwrite, defect information having replacement information "1" is needed according to an aspect of the present invention.

In conclusion, if logical overwriting is to be performed or not depends on an information item on a write-once medium and it is necessary for a drive system of the write-once medium to recognize defect information having the replacement information of "1". Accordingly, a write-once medium including information used to determine whether or not to permit the logical overwriting needs the defect list entry to have state information of "1."

Figure 6:
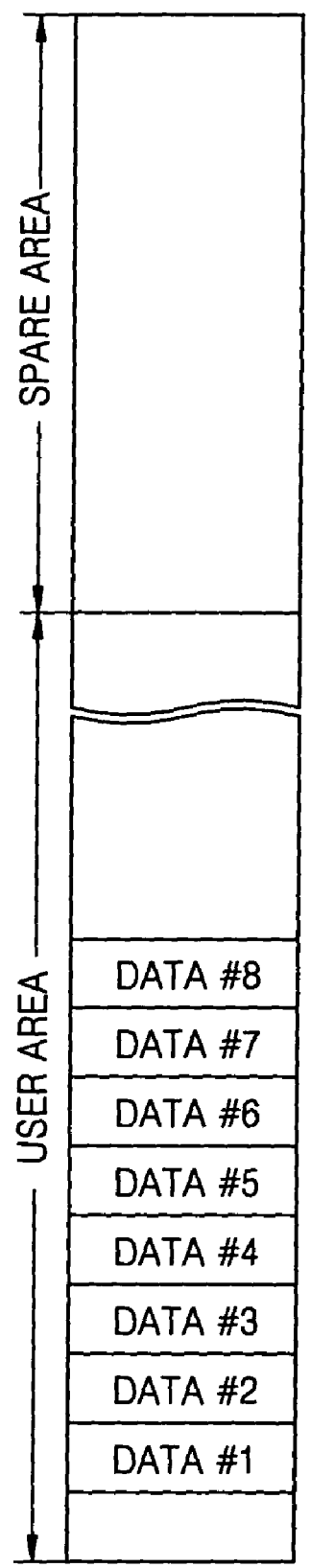
FIG. 6 is a diagram of the initial structure of a disk, explaining a method used by a host to update a defect list according to an aspect of the present invention.

FIG. 6 is a diagram of the structure of a write-once disk used to explain a method used by a host to update a defect list according to an aspect of the present invention.

Referring to FIG. 6, in a user data area of the disk, data #1 through #8 are recorded and a spare area is empty.

FIGS. 7A and 7B are reference diagrams used to explain an update method according to an embodiment of the present invention. In a state as shown in FIG. 6, if updated data is to be written over the locations where data #1 through #4 and data #8 are recorded, the host records defect information on the data items, in the defect list. When defect list entries for the data items are in the defect list, the defect list entries are updated, and when the defect list entries are not in the defect list, the defect list entries are registered. That is, the defect list entries on data #1 through #4 and data #8 are registered, and according to an embodiment of the present invention, "2" indicating a defect block having no replacement block yet is recorded as the replacement information of the defect list entries.

When such defect list entries are registered in the defect list, if the host sends a write command to perform logical overwriting of data on data #1 through #4 and data #8 with new data, the drive system receiving this command records replacements #1 through #5, which are replacement blocks replacing defects #1 through #5, respectively, in the spare area. The drive system determines the locations of the replacement blocks in the spare area, and records replacement blocks including new data, in the determined locations. When recording of the replacement blocks is finished, the drive system updates the replacement information of the defect list entries on defects #1 through #5 with "0", which indicates a defect block having a replacement block.

Figure 8A:
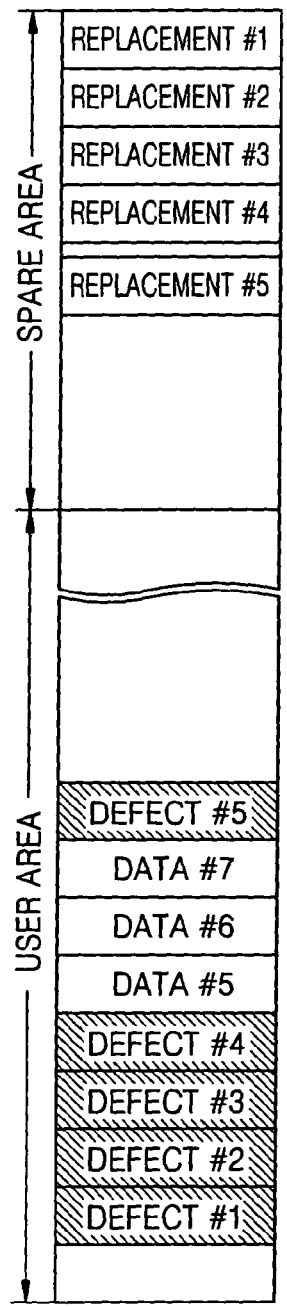
FIGS. 8A and 8B are reference diagrams explaining a method used by a host to update a defect list in order to implement logical overwriting according to another embodiment of the present invention.
Figure 8B:
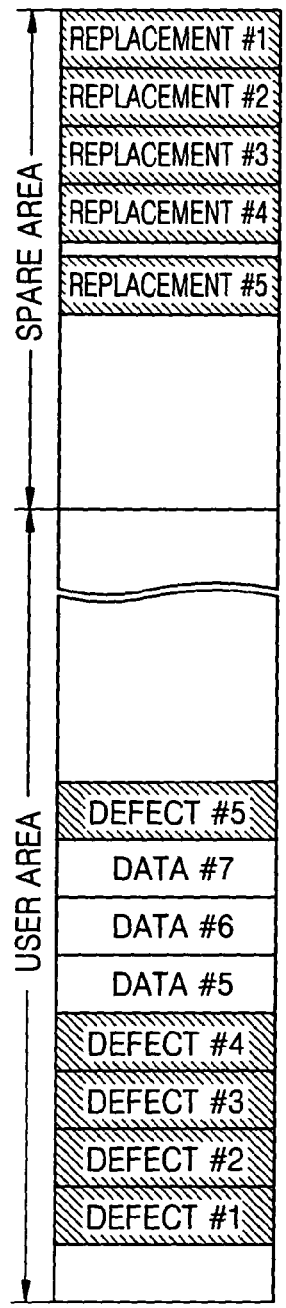

In FIGS. 8A and 8B, reference diagrams explaining an update method according to another embodiment of the present invention are shown.

In a state where data #1 through #8 are recorded in the user area of the disk and the spare area is empty as shown in FIG. 6, if updated data is to be written over the locations where data #1 through #4 and data #8 are recorded, the host records defect information of the data items, in the defect list. When defect list entries for the data items are in the defect list, the defect list entries are updated. When there are no defect list entries in the defect list, the defect list entries are registered. That is, the defect list entries on data #1 through #4 and data #8 are registered and according to another embodiment of the present invention, "1", which indicates a defect having a replacement block replacing the defect block, in which new data is not recorded in the replacement block yet, is recorded as the replacement information of the defect list entries. Referring to FIG. 8A, shown is a state where the locations of replacement blocks in the spare area are determined, but new data is not recorded in the replacement blocks yet.

When the defect list is in a state in which thus defect list entries are registered, if the host sends a write command to perform a logical overwrite of new data over data #1 through #4 and data #8, the drive system receiving this command records replacements #1 through #5, which are replacement blocks replacing defects #1 through #5, respectively, in the spare area. In this case, the drive system does not need to determine locations of the replacement blocks in the spare area, and only records new data on the already determined locations of the replacement blocks. Then, when recording of the replacement blocks is finished, the drive system updates the replacement information of the defect list entries on defects #1 through #5 with "0" indicating a defect block having a replacement block.

Continuous defect information 512 indicates whether a defect block is a continuous defect or a single defect. When continuous defect information is "0", it indicates a single defect entry in which the corresponding defect block is a single defect. When continuous defect information is "1, " the corresponding defect block is a first entry indicating the first defect block of continuous defect blocks, and the defect block address indicates the first defect block of continuous defect blocks, while the replacement block address indicates the first replacement block of continuous replacement blocks replacing the continuous defect blocks. When continuous defect information is "2," the corresponding defect block is a last entry indicating the last defect block of continuous defect blocks, and the defect block address indicates the last defect block of the continuous defect blocks, while the replacement block address indicates the last replacement block of continuous replacement blocks. In the case shown in FIGS. 7A and 7B, defects #1 through #4 form continuous defect blocks, replacements #1 through #4 form continuous replacement blocks. The defect entry corresponding to defect #1 is the first entry of the continuous defect blocks, and the defect entry corresponding to defect #4 is the last entry of the continuous defect blocks. In this continuous defect, the continuous defect blocks can be expressed by only the first entry and the last entry, and the defect entries corresponding to defects #2 and #3 are omitted.

Figure 9:
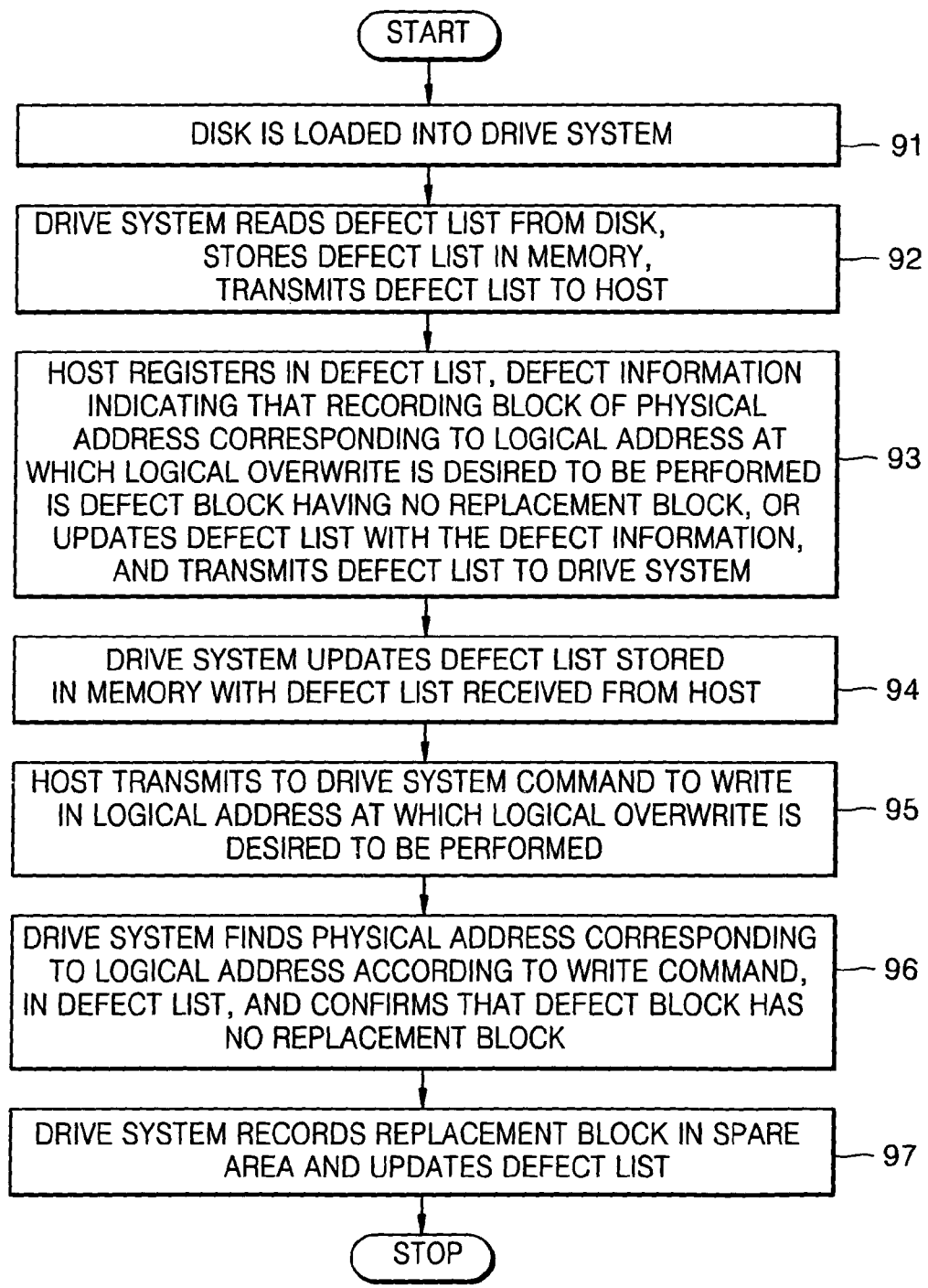
FIG. 9 is a flowchart showing a method used by a host to update a defect list in order to implement logical overwriting according to an embodiment of the present invention.

FIG. 9 is a flowchart showing the process of a method used by a host to update a defect list in order to implement a logical overwrite according to an embodiment of the present invention.

Referring to FIG. 9, if the disk 100 is loaded into the drive system in operation 91, the system controller 25 of the drive system reads a defect list recorded in a predetermined area of the disk and stores the defect list in the memory 26, and also transmits the defect list to the host in operation 92. The defect list can be included in disk management information, and the system controller 25 also reads disk management information other than the defect list, that is, information on the spare area, and stores it in the memory 26.

If the defect list from the drive system is received, the host stores this in the memory 32.

Then, the control unit 31 of the host records in the defect list defect information on a recording block of a physical address on the disk corresponding to a logical address at which a logical overwrite is to be performed. That is, the control unit 31 registers in the defect list stored in the memory 32, defect information indicating that the recording block at which logical overwrite is to be performed, that is, the defect block, has no replacement block, or updates the defect list with the defect information, and transmits the updated defect list to the drive system in operation 93. An example of a defect list thus updated by a host is shown in FIG. 1A.

When the host wants to perform an overwrite over locations of physical addresses from "100000h" to "100100h", the control unit of the host updates the defect list as shown in FIG. 10A. Referring to FIG. 10A, the first entry with defect block address "100000h" and replacement information "2" is registered in the defect list. Replacement information "2" indicates, as described above, the state of a defect block having no replacement block. Accordingly, in the replacement block address of the first entry, nothing is recorded. Next, the second entry with defect block address "100001h" and replacement information "2" is registered. After an entry with defect block address "100FFh" and replacement information "2" is registered, the last entry with defect block address "100100h" and replacement information "2" is registered. Then, in the continuous defect information of each entry of the defect list shown in FIG. 10A, "0" indicating a single defect is recorded.

If the thus updated defect list is received, the system controller of the drive system updates the defect list stored in the memory by using the updated defect list in operation 94.

Next, the control unit 31 of the host transmits a command to write new data at a logical address of which a logical overwrite is to be performed, to the drive system in operation 95.

In operation 96, the system controller 25 of the drive system receiving this write command searches the defect list, and as a result of searching the defect list, confirms that the defect block of the physical address corresponding to the logical address specified by the write command has no replacement block.

Next, the system controller 25 finds information on the spare area from the disk management information, determines the location of the replacement block in the spare area, records the replacement including new data in the spare area, and updates the defect list in operation 97. The defect list thus updated by the drive system is shown in FIG. 10B. Referring to FIG. 10B, it can be seen that a replacement block address at which a replacement block replacing a defect block corresponding to the entry, is recorded in each entry of the defect list. That is, the defect list indicates that a replacement block replacing a defect block having defect block address "100000h" is recorded at replacement block address "110000h", a replacement block replacing a defect block having defect block address "100001h" is recorded at replacement block address "110001h", a replacement block replacing a defect block having defect block address "1000FFh" is recorded at replacement block address "1100FFh", and a replacement block replacing a defect block having defect block address "100100h" is recorded at replacement block address "110100h". Also, "0" is recorded in the replacement information because all defect blocks have replacement blocks in the defect list.

Meanwhile, the defect list recorded using continuous defect information as shown in FIG. 11A can be updated by a drive system as shown in FIG. 11B. In FIG. 11B, in the first entry, "1" is recorded as continuous defect information and "10000h" is recorded as the defect block address. That is, this entry is the start of continuous defect entries indicating a continuous defect and indicates that the first block of the continuous defect blocks is "100000h." In the second entry, "2" is recorded as continuous defect information and "100100h" is recorded as the defect block address. That is, this entry indicates the end of the continuous defect, and indicates that the last block of the continuous defect blocks is "100100h."

Meanwhile, FIGS. 11A and 11B show examples in which by using continuous defect information the defect lists shown in FIGS. 10A and 10B are recorded in smaller areas, which saves recording space on the disk.

Referring to FIG. 11A, in the first entry, "1" is recorded as continuous defect information and "10000h" is recorded as the defect block address. That is, this entry is the first entry of continuous defect entries and indicates that the first block of the continuous defect blocks is "100000h." In the second entry, "2" is recorded as continuous defect information and "100100h" is recorded as the defect block address. That is, this entry indicates the end of the continuous defect, and indicates that the last block of the continuous defect blocks is "100100h."

Referring to FIG. 11B, since replacement blocks are recorded in the defect list shown in FIG. 11A by the drive system, replacement information is recorded as "0" in the defect list and in the first entry and the last entry, replacement block addresses are recorded. Thus, by recording only entries corresponding to the first defect block and the last defect block in relation to continuously occurring defects, the space of the defect list can be used effectively.

Figure 12:
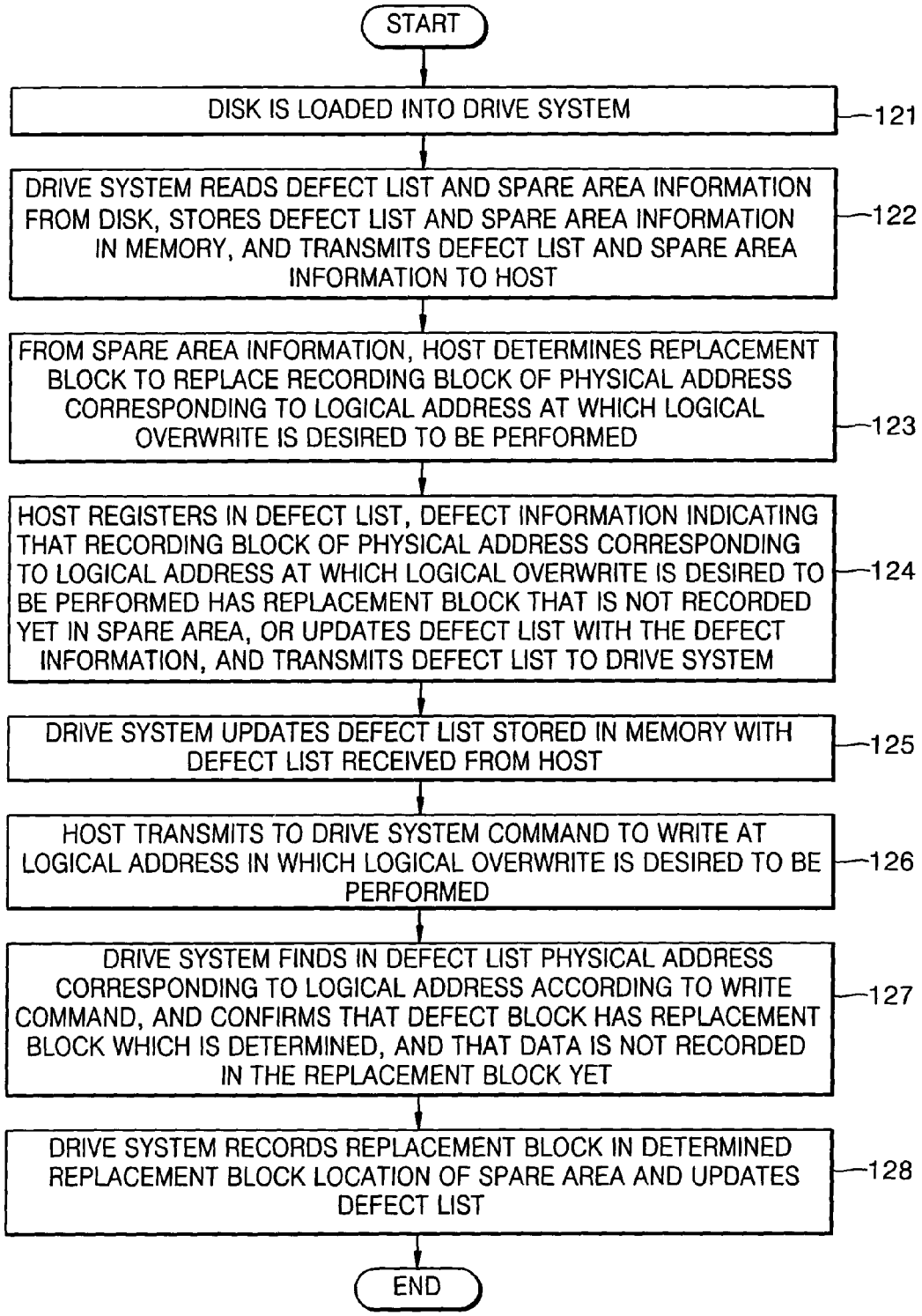
FIG. 12 is a flowchart of a method used by a host to update a defect list by a host in order to implement logical overwriting according to another embodiment of the present invention.

FIG. 12 is a flowchart of a method used by the host to update a defect list in order to implement a logical overwrite according to another embodiment of the present invention.

Referring to FIG. 12, if the disk 100 is loaded into the drive system in operation 121, the system controller 25 of the drive system reads a defect list and spare area information recorded in a predetermined area of the disk and stores the defect list in the memory 26, and also transmits the defect list and spare area information to the host 3 in operation 122.

If the defect list and spare area information from the drive system are received, the host stores these in the memory 32.

Then, the control unit 31 of the host determines a replacement block to replace the recording block of the physical address of the disk corresponding to a logical address at which logical overwrite is to be performed, from the spare area information stored in the memory in operation 123.

Then, the control unit 31 registers in the defect list stored in the memory, defect information indicating that the recording block in which the logical overwrite is to be performed, that is, the defect block, has a replacement block but data is not recorded in the spare area yet, or updates the defect list with the defect information, and transmits the updated defect list to the drive system in operation 124.

An example of a defect list thus updated by the host is shown in FIG. 13A.

When the host desires to perform an overwrite over data stored in locations of physical addresses from "100000h" to "100100h" by using the locations from replacement block addresses from "110000h" to "110001h," the control unit of the host updates the defect list as shown in FIG. 13A. Referring to FIG. 13A, the first entry with defect block address "100000h," replacement block address "110000h," and replacement information "1" is registered in the defect list. Replacement information "1" indicates, as described above, the state of a defect block having a replacement block in which data is not recorded in the replacement yet. Next, the second entry with defect block address "100001h," replacement block address "110001h," and replacement information "1" is registered. After an entry with defect block address "1000FFh," replacement block address "1100FFh," and replacement information "1" is registered, the last entry with defect block address "100100h," replacement block address "110100h," and replacement information "1" is registered. Then, in the continuous defect information of each entry of the defect list shown in FIG. 13A, "0" indicating a single defect is recorded.

If the thus updated defect list is received, the system controller of the drive system updates the defect list stored in the memory by using the updated defect list in operation 125.

Next, the control unit 31 of the host transmits a command to record new data at a logical address of which a logical overwrite is to be performed, to the drive system in operation 126.

In operation 96, the system controller 25 of the drive system receiving this write command searches the defect list, and as a result of searching the defect list, confirms that the defect block of the physical address corresponding to the logical address specified by the write command has a replacement block but data is not recorded yet. In this case, since the location of the replacement block in the spare area to replace the defect block is already determined, the system controller 25 needs only to record new data in the replacement block.

Next, the system controller 25 records the replacement block on the determined location in the spare area and updates the defect list in operation 128. The defect list thus updated by the drive system is shown in FIG. 13B. Referring to FIG. 13B, it can be seen that the contents updated by the drive system are replacement information because the replacement block addresses are already determined by the host and registered in the defect list. That is, after finishing this logical overwrite recording operation, the drive system needs only to record the replacement information in the defect list as "0".

Meanwhile, FIGS. 14A and 14B show examples in which using continuous defect information the defect lists shown in FIGS. 13A and 13B are recorded in smaller areas, saving recording areas on the disk.

See FIG. 14A, in the first entry, "1" is recorded as continuous defect information, "100000h" is recorded as the defect block address, and "110000h" is recorded as the replacement block address. That is, this entry is the first entry of continuous defect entries and indicates that the first block of the continuous defect blocks is "100000h" and the address of the replacement block replacing this first defect block is "110000h." In the second entry, "2" is recorded as continuous defect information, "100100h" is recorded as the defect block address, and "110100h" is recorded as the replacement block address. That is, this entry indicates the end of the continuous defect, and indicates that the last block of the continuous defect blocks is "100100h" and the address of the replacement block replacing the last block is "110100h."

Referring to FIG. 14B, since replacement blocks are recorded in the defect list shown in FIG. 14A by the drive system, replacement information is recorded as "0" in the defect list. Thus, by recording only entries corresponding to the first defect block and the last defect block in relation to continuously occurring defects, the space of the defect list can be used effectively.

The logical overwrite process according to an aspect of the present invention as described above can be applied when an optical recording information storage medium permits logical overwriting. If it is always permitted, it does not matter, but if a disk does not permit logical overwriting, the host should not update a defect list. In order to prevent unnecessary updating, it is desirable that when a disk does not permit logical overwriting, the drive system does not transmit the defect list to the host. However, if the defect list needs to be transmitted to the host for other purposes, it is more desirable that the host updates the defect list. The host can receive from the drive system information recorded on a disk indicating whether or not a logical overwriting is permitted, and determine whether or not the defect list is to be updated for the logical overwrite.

Meanwhile, the embodiments above are described with reference to a write-once medium. Though the method according to the present invention can be effectively applied to the write-once medium, it can also be applied to other rewritable media in the same manner.

The recording method as described above can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The embodiments should be considered in descriptive sense only and not for purposes of limitation. Therefore, the scope of the invention is defined not by the detailed description of the invention but by the appended claims, and all differences within the scope will be construed as being included in the present invention.

According to the present invention as described above, overwrite can be implemented on a write-once medium and furthermore, when this overwrite is implemented, the load to the drive system can be reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording data on an information recording medium comprising:
updating a defect list comprising a first defect entry comprising status information, defect block address information, and replacement block address information in a host, by adding a second defect entry to the defect list, the second defect entry regarding an address at which the data is already recorded, when update data is desired to be recorded on the information recording medium at the address at which the data is already recorded; and
transmitting to a recording and/or reproducing apparatus the updated defect list and a command to write the update data at the address at which the data is already recorded.

2. The method of claim 1, further comprising:
receiving from the recording and/or reproducing apparatus the defect list including the defect information regarding the data recorded on the information recording medium.

3. The method of claim 1, wherein the updating the defect list comprises:
recording in the defect list the defect information including replacement information indicating that a defect block corresponding to the address at which the data is already recorded on the information recording medium is a defect which does not have a replacement block to replace the defect block.

4. The method of claim 3, wherein in the defect list, only entries corresponding to a first defect block and a last defect block are recorded when continuous defects occur.

5. The method of claim 1, wherein the updating the defect list comprises:
recording in the defect list the defect information including replacement information indicating that a defect block of the address at which the data is already recorded on the information recording medium is a defect which has a replacement block which is to replace the defect block, and that no data is recorded in the replacement block yet.

6. The method of claim 5, updating the defect list further comprises:
selecting the replacement block in a spare area disposed for replacement blocks.

7. A method of recording data on an information recording medium comprising:
transmitting to a host a defect list including defect information of the data recorded on the information recording medium, the defect list comprising a first defect entry comprising status information, defect block address information, and replacement block address information, the defect list being updated in the host by adding a second defect entry to the defect list, the second defect entry regarding an address at which the data is already recoded, when update data is desired to be recorded on the information recording medium at the address at which the data is already recorded;
receiving an updated defect list from the host and updating a defect list;
receiving from the host a command to write update data at an address in which the data is already recorded on the information recording medium; and
recording the update data on the information recording medium by referring to the updated defect list.

8. The method of claim 7, wherein the updated defect list includes defect information of the address at which the data is already recorded on the information recording medium.

9. The method of claim 8, wherein the defect information includes replacement information indicating that a defect block corresponding to the address at which the data is already recorded on the information recording medium is a defect which does not have a replacement block replacing the defect block.

10. The method of claim 9, wherein recording the data on the information recording medium comprises:
recording the replacement block including the update data, in a spare area of the information recording medium.

11. The method of claim 8, wherein the defect information includes replacement information indicating that a defect block corresponding to the address at which the data is already recorded on the information recording medium is a defect which has a replacement block to replace the defect block, and that no data is recorded in the replacement block yet.

12. The method of claim 11, wherein recording the data on the information recording medium comprises:
recording the update data in the replacement block in the spare area of the information recording medium.

13. A host apparatus controlling data to be recorded on an information recording medium, comprising:
a memory unit which stores a defect list which is received from a recording and/or reproducing apparatus and includes defect information regarding the data recorded on the information recording medium;
a control unit which, updates the defect list comprising a first defect entry comprising status information, defect block address information, and replacement block address information, by adding a second defect entry to the defect list, the second defect entry regarding an address at which the data is already recorded, when update data is desired to be recorded on the information recording medium at the address at which the data is already recorded transmits the updated defect list and a write command to record the update data at the address in which the data is already recorded, to the recording and/or reproducing apparatus.

14. The host apparatus of claim 13, wherein the control unit records in the defect list stored in the memory unit the defect information including replacement information indicating that a defect block corresponding to the address at which the data is already recorded on the information recording medium is a defect which does not have a replacement block to replace the defect block.

15. The host apparatus of claim 13, wherein the control unit records in the defect list stored in the memory unit the defect information including replacement information indicating that a defect block corresponding to the address at which the data is already recorded on the information recording medium is a defect which has a replacement block to replace the defect block, and that no data is recorded in the replacement block yet.

16. The host apparatus of claim 13, wherein the host apparatus registers in the defect list a physical address corresponding to a logical address at which logical overwrite is to be performed, as the defect information having a replacement block in which the data is not recorded yet.

17. The host apparatus of claim 13, wherein the control unit registers in the defect list stored in the memory unit, the defect information indicating that a recording block at which logical overwrite is to be performed, has no replacement block, or updates the defect list with the defect information and transmits the updated defect list to the recording and/or reproducing apparatus.

18. A recording and/or reproducing apparatus comprising:
a writing and/or reading unit which records data on and/or reads data from an information recording medium;
a control unit, which controls the writing and/or reading unit such that the data is recorded on the information recording medium by referring to an updated defect list in response to receiving from a host the updated defect list and a write command to record update data at an address in which the data is already recorded,
wherein the defect list comprises a first defect entry comprising status information, defect block address information, and replacement block address information, the defect list being updated in the host by adding a second defect entry to the defect list, the second defect entry regarding an address at which the data is already recorded, when update data is desired to be recorded on the information recording medium at the address at which the data is already recorded.

19. The recording and/or reproducing apparatus of claim 18, wherein the updated defect list includes defect information regarding the address in which the data is already recorded on the information recording medium.

20. The recording and/or reproducing apparatus of claim 19, wherein the defect information includes replacement information indicating that a defect block corresponding to the address in which the data is already recorded on the information recording medium is a defect which does not have a replacement block to replace the defect block.

21. The recording and/or reproducing apparatus of claim 20, wherein the control unit controls the writing and/or reading unit such that a replacement block including the update data is recorded in a spare area of the information recording medium.

22. The recording and/or reproducing apparatus of claim 19, wherein the defect information includes replacement information indicating that a defect block corresponding to the address in which the data is already recorded on the information recording medium is a defect which has a replacement block to replace the defect block, and that no data is recorded in the replacement block yet.

23. The recording and/or reproducing apparatus of claim 22, wherein the control unit controls the writing and/or reading unit such that the update data is recorded in the replacement block of a spare area of the information recording medium.

24. A method of recording data on a disk comprising:
updating a defect list comprising a first defect entry comprising status information, defect block address information, and replacement block address information in a host, by adding a second defect entry to the defect list, the second defect entry regarding an address at which the data is already recorded, when updated data is desired to be recorded on the information recording medium at the address at which the data is already recorded, and
transmitting to a recording and/or reproducing apparatus the updated defect list when new data is to be recorded on the disk.

25. A recording and/or reproducing apparatus comprising:
a writing and/or reading unit reading a defect list recorded on a predetermined area of a disk;
a control unit controlling the writing and/or reading unit and transmitting the defect list to a host;
the host receiving from the control unit the defect list, and updating the defect list comprising a first defect entry comprising status information, defect block address information, and replacement block address information, by adding a second defect entry to the defect list, the second defect entry regarding an address at which the data is already recorded, when updated data is desired to be recorded on the information recording medium at the address at which the data is already recorded, and transmitting the updated defect list to the control unit, wherein the control unit controls the writing and/or reading unit to write the data on a spare area of the disk based on the updated defect list.

26. The apparatus of claim 25, wherein the control unit searches in the updated defect list for a physical address on the disk corresponding to a logical address on the disk.

* * * * *